Oct. 20, 1970        A. J. VASILATOS        3,535,018

NOTCHED OPTICAL FIBER CABLE

Filed July 29, 1968

INVENTOR
ANASTASIOS J. VASILATOS

*Finnegan, Henderson & Farabow*

ATTORNEYS

United States Patent Office 3,535,018
Patented Oct. 20, 1970

3,535,018
NOTCHED OPTICAL FIBER CABLE
Anastasios J. Vasilatos, Chicago, Ill., assignor to Bell & Howell Company, Chicago, Ill., a corporation of Illinois
Filed July 29, 1968, Ser. No. 748,313
Int. Cl. G02b 5/16
U.S. Cl. 350—96                                              2 Claims

ABSTRACT OF THE DISCLOSURE

Notched optical fiber cables are prepared by cutting a plurality of longitudinally-spaced notches in a sheath-covered bundle of light transmitting fibers. At each notch a portion of the cross-section of the sheath is removed and at least one fiber that extends back to the light source end of the bundle is severed.

---

This invention relates to a process for producing a multiple outlet fiber optic cable for use in illumination systems and to the fiber optic cables so produced.

Control panels, instrument panels, computer consoles, and many other devices require back lighting for accuracy of operation and in the case of instrument panels for accuracy of reading. Often it is necessary to supply a source of light at many widely separated locations behind such control and instrument panels.

One specific example of a device where a multiple outlet illumination system is desirable is a motion picture projector. A plurality of light outlets on the control panel of a projector are desirable to illuminate control switches such as the on-off switch and the framing control. The operator of a movie projector when faced with the task of making a control adjustment often finds the amount of light falling on the exterior of the projector inadequate to quickly locate the desired control.

The use of a separate electric lamp or bulb at each of the locations where illumination may be required on a control panel objectionably introduces numerous possibilities for a lamp failure and may result in placement of a lamp in a location where access for replacement is difficult.

The space requirements for electric lamps is another problem associated with their use in instrument and control panels. The physical dimension of a lamp usually adds to the transverse dimension of the panel, and the need for transferring the heat generated by some lamps requires further space.

There has been a continuing search for compact, easily installed, inexpensive, multiple outlet illumination systems for use in control and indicator panels.

The present invention provides a method for conveniently and inexpensively preparing an optical fiber cable for use in a multiple outlet illumination system. The cables can be used in multiple outlet illumination systems that are compact, relatively inexpensive, and easy to install behind switchplates, control panels, indicator panels, and the like.

Accordingly, the present invention provides a fiber optic cable for use in a multiple outlet illumination system comprising a plurality of light transmitting fibers having substantially the same length and arranged to form a bundle. A flexible sheath encloses the bundle to hold the fibers in longitudinal alignment. A plurality of notches extend in spaced relationship from the light source end of the bundle with each notch passing through only a portion of the surface of the sheath so that the sheath remains longitudinally intact, and with each notch further passing through at least one of the fibers that extends continuously from the light source end to sever the fiber and to permit light from the severed fiber to pass out of the cable at the notch.

The present invention also provides a process for preparing a fiber optic cable for use in a multiple outlet illumination system, comprising: cutting a plurality of longitudinally-spaced notches in a sheath-covered bundle of light transmitting fibers, each notch being cut by removing only a portion of the cross-section of the sheath and by severing at least one fiber that extends continuously back to the light source end of the bundle, the fiber being severed at a point longitudinally-aligned with the removed portion of the sheath to permit light from the severed fiber to pass out of the sheath through the removed portion.

It is to be understood that both the foregoing general description and the following detailed description are exemplary and explanatory but are not restrictive of the invention.

The accompanying drawings which are incorporated in and constitute a part of this specification illustrate one embodiment of the invention, and together with the description, serve to explain the principles of the invention.

Reference will now be made in detail to the present preferred embodiment of the fiber optic cable, an example of which is illustrated in the accompanying drawings. The illustrated fiber optic cable can be used for illuminating the control switches commonly found on motion picture projectors.

Figure 1:
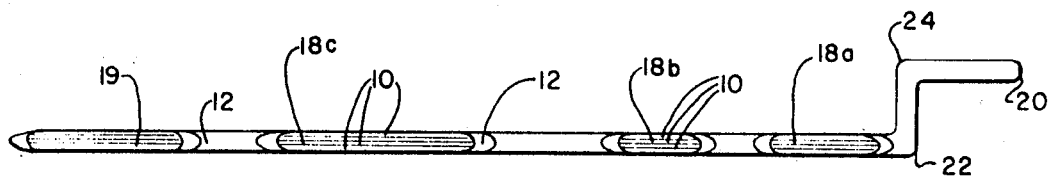
FIG. 1 is a plan view of an optical fiber cable of the invention.

As seen in FIG. 1, the fiber optic cable includes a plurality of longitudinally-aligned, parallel strands of light transmitting fibers 10 enclosed by a sheath 12 of flexible material that preferably does not transmit light. A light source, such as projector lamp 14, seen in FIG. 2, transmits light into end 16 of the bundle. The light is "piped" by fibers 10 to a plurality of notches 18a, 18b, and 18c that are each formed by removing a portion of sheath 12 and by severing at least one fiber 10 that extends continuously back to the light source end 16 of the bundle.

At each notch, light is diffused at the severed surface of the fiber and light passes from the cable through the removed portion of sheath 12. Light also passes from the cable at cut 19 which extends transversely across the bundle of fibers 10.

Figure 2:
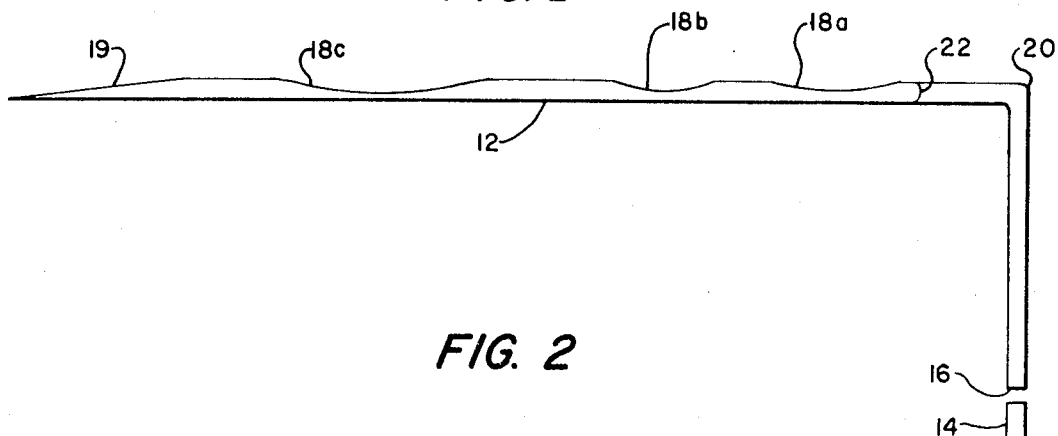
FIG. 2 is a side elevation of the cable of FIG. 1 and includes a source of light.

As illustrated in FIGS. 1 and 2, the optical fiber cable includes three 90° bends at 20, 22, and 24. This configuration illustrates the ability of the light cable to transmit light from projector lamp 14 to a plurality of points adjacent the face of a switchplate or the like, even if an opaque object is positioned in a direct line between the lamp and the desired light output points.

As here embodied, a straight portion of the optical fiber has a plurality of aligned notches 18a, 18b, and 18c, and a final cut 19, therein to provide a series of light outputs that can be positioned adjacent a plane surface such as a projector switchplate aligned parallel to the axis of the fibers. At each notch, the top portion of sheath 12 is removed while the bottom portion and a portion of the side of sheath 12 remain intact. The depth of cut through the bundle of optical fibers increases with increasing distance of the notches from light source end 16.

Assuming that approximately equal amounts of output light are desired at each of the three notches and the final cut 19 illustrated in FIGS. 1 and 2, approximately equal numbers of fibers should be severed at each notch and at the final cut. Thus, at notch 18a the upper 25 percent of the fibers in the bundle are severed, at notch 18b the depth of cut increases and the next 25 percent of the fibers are severed. This increasing depth of cut is continued at each notch, until at cut 19, the entire bundle and sheath are severed.

The top fibers in the bundle will pass light out of notch 18a; the second lower group of fibers will pass light out of notch 18b; and so on until at the last complete cut 19, light is passed out from the remaining bottom fibers.

It should be noted that at each notch, sheath 12 remains intact at the side and bottom of the cable to hold the fibers 10 stationary and to prevent shifting of the fibers. Each of the fibers terminates in a common plane at light source end 16 and extends the length of the bundle, but can be discontinuous at one or more of the notches. It should also be noted that the fibers 10 prior to cutting the notches therein extend from end 16 to cut 19 and thus do not terminate after their severance in a notch. Thus, the cable exhibits more uniform mechanical strength properties throughout its length than it would if the fibers terminated at each point of severance and only the lower group of fibers was present adjacent cut 19.

The optical fibers should be of a material that exhibits crystal clarity and transparency. Particularly suitable materials for the optical fibers include glass fibers and acrylic resins. It is possible to transmit light in these materials around curves and around corners. Such materials, because of freedom from internal haze, can transmit light from commercially useful distances. Desirably, for ease of installation, the fibers are flexible and can be easily deformed. Methacrylate resins form a preferred material for the optical fibers.

The sheath is preferably made of a flexible opaque material which does not transmit light, and which provides mechanical insulation for the optical fibers. The sheath material helps protect the fibers from surface scratching or marring which would cause light diffusion at the scratched or marred surface. The mechanical insulating properties of the sheath enable fastening means to be affixed to the optical cable without scratching or marring the fibers and thus simplify installation of the optical cable. The sheath material should possess sufficient strength so that when three-quarters or more of the cross-section of the sheath is cut or ground away, the sheath will remain intact lengthwise. A variety of thermoplastic synthetic resins in extruded, or woven fibrous form, can be used as sheath materials.

In accordance with the process of the invention, optical fiber cables that are capable of use in a multiple-outlet illumination system are produced by cutting a plurality of longitudinally-spaced notches in a sheath-enclosed bundle of light transmitting fibers. The starting material for the process comprises a plurality of longitudinally-aligned light transmitting fibers, grouped together to form a bundle, enclosed by a sheath made of a flexible material which preferably does not transmit light. One end of the bundle of fibers is not covered by the sheath, and the fibers at this end terminate in a common plane for ease of illumination by a light source.

In accordance with the process of the invention, notches are cut by removing only a portion of the sheath along the length of each notch and by severing at least one fiber that extends continuously back to the light source end of the bundle. Various material-working techniques may be used to cut the notches in accordance with the invention. Typical material-working techniques include slicing, grinding, boring, and drilling. In general, the notches can be cut by any conventional material-working technique that is applicable to the material selected for the optical fiber and the sheath.

Only a portion of the sheath along the length of each notch is removed by the cutting operation. Allowing the sheath to remain intact lengthwise permits the sheath to hold the fibers stationary and helps prevent shifting of the fibers.

At each notch, at least one fiber that extends continuously back to the light source end of the bundle is severed. This insures that, at each notch, light from the source will be diffused at the severed surface of the fiber and transmitted through the removed portion of the sheath.

In the practice of the method of the invention, the cutting of the fibers can result in various surface finishes on the cut surface of the fibers including optically-flat and polished surfaces, and rough diffusing surfaces. If the cut surface is rough, light is diffused from the surface in all directions, while if the cut surface is polished, light will be refracted or internally reflected at the surface depending on the angle of the cut.

A rough diffusing cut surface is preferred and is more easily produced than a polished surface which requires precision grinding. A rough surface scatters light in all directions and obviates any problems of total internal reflection.

A rough cut surface insures that certain portions of the surface are positioned at an angle of less than the angle of total reflection irregardless of the overall angle of cut. Thus a portion of the light from the cut fiber will be transmitted from the cable when a rough cut surface is provided.

However, if a flat polished surface is provided, the angle of cut should be chosen to be less than the angle of total internal reflection. Total internal reflection for an axial ray will occur when the angle of cut (as measured from a plane normal to the fiber axis) equals or exceeds the angle given by:

$$\sin^{-1}\left(\frac{1}{n_D}\right)$$

where $n_D$ denotes the index of refraction of the fiber material. For materials having typical indices, this angle of total internal reflection is in the range of 35° to 45°. To insure that this range is avoided, an angle of cut of not more than 30° is preferred when a smooth polished surface is provided.

Figure 3:
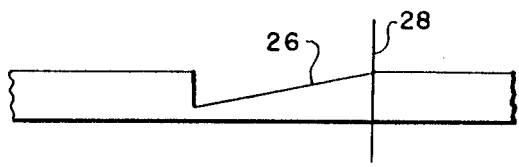
FIGS. 3 and 4 illustrate alternate configurations of notches provided in the cable according to the invention.
Figure 4:
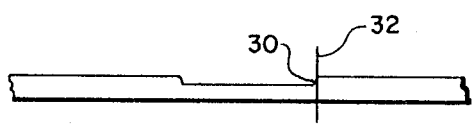

FIGS. 3 and 4 illustrate alternate notch configurations. In FIG. 3, it is assumed that the light source is located to the right of the notch. The angle of cut is inclined at an angle more than 30° to a plane 28 normal to the axis of the fibers. This notch configuration is satisfactory if the cut surface 26 adjacent the light source end of the fiber is rough, so that at least a portion of the light rays directed at the surface are inclined at less than the angle of total internal reflection with respect to the portion of the surface they strike, and the surface thus diffuses light.

FIG. 4 illustrates a notch configuration where the cut surface 30 of fibers that extend continuously back to the light source are inclined at an angle of not more than 30° with respect to a plane 32 normal to the axis of the fibers. The notch configuration of FIG. 4 will transmit light from the cut fibers when provided with either a flat polished surface or a rough diffusing surface.

The length of the cut surface, that is its dimension along the axis of the fibers, is another factor besides the roughness of the surface, that can be varied to obtain the degree of light concentration or diffusion desired.

When the optical fiber cable is to be used to illuminate a plurality of points adjacent a plane surface, there is a particularly desirable procedure for making the cuts. This involves aligning a portion of the fiber cable in a straight line and making a series of progressively deeper cuts that remove peripherally-aligned portions of the sheath.

Peripheral alignment of the cuts is accomplished by removing at each notch a portion of the cable that would be positioned tangentially with respect to a plane surface aligned parallel to and in contact with the straight length of the fiber cable. In the embodiment of FIGS. 1 and 2, each of the removed portions of the cable that form the notches includes a portion of the cable that would be tangent to a horizontal plane. Peripherally aligning the cuts permits the light transmitted from each of the cuts to be directed towards the adjacent plane surface.

Some light transmitted from the cut light fiber is directed towards and then reflected by the portions of the notch opposite the cut surface of the fiber. The notch configuration can be designed to direct this reflected light to a desired location. Thus, for example, the configuration of the surface of the notch opposite cut surface 26 permits varying the intensity or degree of diffusion of light transmitted from the cut surface.

The method of the invention provides a particularly advantageous procedure for preparing optical cables for use in multiple outlet illumination systems. Notches in the cables can be easily and inexpensively cut. The resulting notched cable is convenient to install due to its flexibility and small cross-section, and takes up little space. Once installed, the notched cable is difficult to physically damage by shock abrasion.

The invention in its broader aspects is not limited to the specific details shown and described, but departures may be made from such details without departing from the principles of the invention and without sacrificing its chief advantages.

I claim:
1. A fiber optic cable for use in a multiple outlet illumination system comprising: a plurality of flexible light transmitting fibers having substantially the same length and arranged to form a bundle; a flexible opaque sheath of material enclosing said bundle to hold said fibers in longitudinal alignment; and a plurality of peripherally aligned notches extending in spaced relationship from the light source end of the bundle to provide a plurality of spaced light outputs, each notch passing through only a portion of the surface of said sheath so that said sheath remains longitudinally intact, and passing through at least one of said fibers that extends continuously from the light source end to sever the fiber, with the depth of cut of said notches increasing with increasing distance from the light source end of the bundle so that a fiber piping light is severed in each notch, the end face of each severed fiber being configured to permit the light from the severed fiber to pass directly out of the cable at each said notch.

2. The cable of claim 1 wherein said continuously extending fiber is cut at each notch at an angle below the angle of total reflection for the optical fiber with respect to a plane normal to the fiber axis to insure refraction at the cut surface of the fiber.

References Cited

UNITED STATES PATENTS

| | | |
|---|---|---|
| 3,043,947 | 7/1962 | Albinger. |
| 3,131,690 | 5/1964 | Innis et al. |
| 3,183,815 | 5/1965 | Kapany et al. _____ 350—96 X |

FOREIGN PATENTS 976,524  11/1964  Great Britain.

OTHER REFERENCES

"Fiber Optics Large Scale Read-Only Memory" in IBM Technical Disclosure Bulletin, vol. 4, No. 5, October 1961, pgs. 76 and 77 cited.

DAVID H. RUBIN, Primary Examiner

U.S. Cl. X.R.

240—1